United States Patent [19]

Machi et al.

[11] 4,004,995

[45] Jan. 25, 1977

[54] PROCESS FOR REMOVING NITROGEN OXIDES AND SULFUR DIOXIDE FROM EFFLUENT GASES

[75] Inventors: Sueo Machi, Takasaki; Keita Kawamura, Yokohama; Shingi Aoki, Fujisawa; Waichiro Kawakami; Shoji Hashimoto, both of Takasaki, all of Japan

[73] Assignees: Ebara Manufacturing Co., Ltd.; Japan Atomic Energy Research Institute, both of Tokyo, Japan

[22] Filed: Feb. 28, 1974

[21] Appl. No.: 446,788

[30] Foreign Application Priority Data

| Mar. 3, 1973 | Japan | 48-25290 |
| Mar. 3, 1973 | Japan | 48-25292 |
| Aug. 15, 1973 | Japan | 48-91549 |
| Aug. 15, 1973 | Japan | 48-91550 |
| Sept. 22, 1973 | Japan | 48-107123 |

[52] U.S. Cl. .................. 204/157.1 H; 204/157.1 R; 423/235; 423/242
[51] Int. Cl.² ........................................ B01J 1/00
[58] Field of Search ............ 204/157.1 R, 157.1 H; 423/242, 235

[56] References Cited

UNITED STATES PATENTS

| 3,034,853 | 5/1962 | Schmidt et al. | 423/235 |
| 3,198,721 | 8/1965 | Rich | 204/157 |
| 3,389,971 | 6/1968 | Alliger | 23/277 |
| 3,565,777 | 2/1971 | Lauer | 204/157.1 |
| 3,653,185 | 4/1972 | Scott et al. | 55/103 |
| 3,674,435 | 7/1972 | Luik, Jr. et al. | 204/157.1 R |
| 3,715,187 | 2/1973 | Bartholomew et al. | 423/242 |
| 3,754,074 | 8/1973 | Grantham | 423/235 |
| 3,790,660 | 2/1974 | Earl et al. | 423/242 |
| 3,869,362 | 3/1975 | Machi et al. | 204/157.1 H |

FOREIGN PATENTS OR APPLICATIONS

| 237,257 | 10/1926 | United Kingdom | 423/533 |
| 308,721 | 3/1929 | United Kingdom | 183/7 |

Primary Examiner—Earl C. Thomas
Assistant Examiner—Wayne A. Langel
Attorney, Agent, or Firm—Stevens, Davis, Miller & Mosher

[57] ABSTRACT

Removal of gaseous pollutants such as nitrogen oxides and sulfur dioxide from effluent gases can be carried out advantageously from an industrial viewpoint by effecting irradiation of said gases under specifically selected conditions. High dose rate electron beam irradiation at a dose rate in the region of $10^5$ rad/sec or higher is, unexpectedly, remarkably effective and efficient for said purpose. Irradiation under increased pressure is also preferable. Wash of gases after irradiation or effecting irradiation in the presence of water vapor is effective especially for the removal of nitrogen oxides. Further, by carrying out the process in two-steps in which nitrogen oxides are removed from such gases almost completely by irradiation with the minimum dose of electron beams before sulfur dioxide is removed from the thus treated gases by conventional desulfurization means, the process can be carried out very economically. Thus, it has become industrially feasible to treat the effluent gases with irradiation, for the removal of nitrogen oxides and sulfur dioxide before releasing them into the atmosphere.

12 Claims, 5 Drawing Figures

PROCESS FOR REMOVING NITROGEN OXIDES AND SULFUR DIOXIDE FROM EFFLUENT GASES

This invention relates to an improved process for removing pollutants, especially sulfur dioxide and nitrogen oxides, from effluent gases which are generated by various chemical processes and by combustion of carbonaceous fuels. More particularly, the invention relates to treating effluent gases with an ionizing radiation or ultraviolet light so that these pollutants may be changed into particle form or mist, thereby enabling collection of the particles or mist pollutants by conventional collecting means such as electrostatic precipitators, filters, cyclones and the like.

Today, a large amount of effluent gases are generated from various sources including various industrial plants such as, for example, metallurgical processes, iron and steel plants, sulfuric, nitric and other acid production plants, paper making plants, atomic power plants and the like. The effluent gas sources also include various combustion apparatuses, research institutes or laboratories, engines of automobiles, and the like. The whole amount of these effluent gases which are generated and released into the atmosphere every day throughout the country must be tremendous. Any of these effluent gases generally includes at least one pollutant selected from noxious gases such as: sulfur dioxide; nitrogen oxides of various forms (hereinafter referred to as $NO_x$); carbon monoxide; carbon dioxide; hydrogen fluoride; hydrogen chloride and the like; and noxious particles such as: fly ash arising from mineral matter in coal, for example, aluminum silicate; coal dust or grit; coke dust; dust of roasted or unroasted concentrate arising from finely powdered raw material for metallurgy; mist of sulfuric and other acid; and the like.

Many attempts have been made, up to now, to remove these pollutants from the effluent gases before releasing them to the atmosphere, and many useful methods and apparatuses have been developed. However, among the above mentioned pollutants, sulfur dioxide and nitrogen oxides, particularly nitrogen oxides are not easy to satisfactorily remove, and there has not been, up to now, a process proven to be advantageous in practice. In addition, sulfur dioxide and nitrogen oxides are particularly noxious and harmful to the human body. Further, these pollutants are considered to be among the most important constitutents of photochemical smog which is now a matter of series concern to those living in cities. Hereupon, the present inventors' study has principally been directed to the removal of sulfur dioxide and nitrogen oxides from effluent gases. Accordingly, the following disclosure is made with particular reference to the removal of nitrogen oxides and/or sulfur dioxide. But, it will be understood that although the improved method of the present invention is particularly useful for removing sulfur dioxide and/or nitrogen oxides, it is also useful for removing the other pollutants as previously mentioned, and the entire object of the present invention is directed to providing an effective and efficient process for purifying effluent gases to a satisfactory degree before releasing them into the atmosphere.

In the first place, the present inventors' attention was directed to the relation between the irradiation conditions and the efficiency of removal of said gas pollutants, using an electron beam accelerator and the effluent gases generated by combustion of B-grade heavy oil. As a result, it was discovered that with electron beam irradiation, there is a characteristic specific "dose rate effect" effective for removing pollutants, mainly $NO_x$ and $SO_2$, from effluent gases. In other words, they found that in the process of purifying effluent gases by electron beam irradiation, removal of sulfur dioxide and nitrogen oxides can be carried out more effectively when high dose rate irradiation is used than when low dose rate irradiation is used. That is, even if the total dose given to the effluent gases is the same, carrying out irradiation at a higher dose rate is much more effective than using a lower dose rate. This result was unexpected, because, in general, when gaseous materials are irradiated with a radiation in cases such as, for example, the case in which ethylene is polymerized by means of a radiation, a high dose rate is usually less effective than a low dose rate for bringing about effective reactions between produced radicals and ions, because a large percentage of the radicals and ions, etc. produced by high dose rate irradiation disappear before those radicals and ions react with monomers. Thus, it has been considered that low dose rate irradiation is preferable for any vapor phase reaction which is carried out by means of irradiation.

Based on the unexpected discovery as mentioned above, the present inventors have accomplished an improved process for removing gaseous pollutants, mainly $NO_x$ and $SO_2$, from industrial effluent gases.

In the practice of this process, irradiation is conveniently carried out using high energy electron beams from sources such as an electron beam accelerator.

The dose rate which can be employed is in the range of from about $10^5$ rad/sec to about $10^{15}$ rad/sec, preferably, in the range of from $10^5$ rad/sec to $10^{10}$ rad/sec and most preferably, in the range of from $10^5$ rad/sec to $10^8$ rad/sec.

The total dose required to obtain satisfactory removal of pollutants is in the range of from $1 \times 10^6$ rad to $1 \times 10^7$ rad.

In the practice of this process, staying time of effluent gases in a reaction chamber is usually in the range of 1 second to 20 seconds. However, if necessary, very short staying time such as less than 1 second can be employed. The following examples are to illustrate the advantages of the above mentioned process of the present invention based on said characteristic, specific dose rate effect.

EXAMPLE 1

10 N m³/hr (normal cubic meters per hour) of heavy oil combustion gas containing 1000 ppm of $SO_2$ and 310 ppm of $NO_x$ was delivered to a reaction chamber, where the gas was irradiated at 150° C with electron beams from the electron beam accelerator at a dose rate of $6.45 \times 10^5$ rad/sec for a total dose of 0.97 Mrad. Subsequently, the irradiated gas was delivered to an electrostatic precipitator to collect solidified and conglomerated pollutants. A gas sample was taken from the stream following exit from an outlet of said electrostatic precipitator, and the $NO_x$ and $SO_2$ content was measured. $SO_2$ and $NO_x$ were present in the proportion of 610 ppm and almost 0 ppm respectively; that is, the desulfurization ratio was 39% and the denitration ratio was almost 100%.

EXAMPLES 2 – 4

Figure 1:
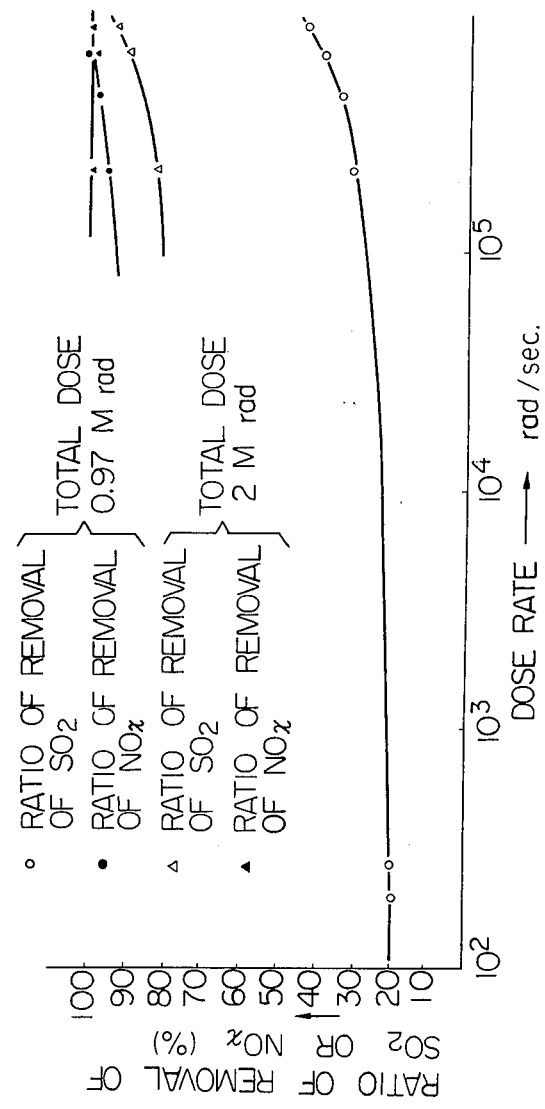
FIG. 1 shows the relationship between the amount of $SO_2$ or $NO_x$ removal and dose rate.

Similar experiments were effected under the same conditions as those in Example 1 except that the dose rates were $2.15 \times 10^5$ rad/sec, $4.3 \times 10^5$ rad/sec and $8.6 \times 10^5$ rad/sec, respectively. In all cases, the radiation was 0.97 Mrad of electron beams. The results are shown in FIG. 1, together with the results obtained in Example 1.

EXAMPLES 5 – 6 (reference examples)

Similar experiments were carried out under the same conditions as those in Example 1 except that Co-60 was used as a radiation source and dose rates were 200 rad/sec and 270 rad/sec, respectively. In both cases, the total dose was 0.97 Mrad. Results showed that the desulfurization ratios were less than 20% in both cases. These results also are shown in FIG. 1, together with results of other experiments.

EXAMPLES 7 – 9

Similar experiments were carried out under the same conditions as those in Example 1 except that the dose rates were $2.15 \times 10^5$ rad/sec and $8.6 \times 10^5$ rad/sec, respectively, and the total electron beam dose was 2.5 Mrad in all cases. The results are shown in FIG. 1, together with those of other experiments.

From the results of Examples 1 – 9 mentioned above, and FIG. 1 which diagrammatically represents the above results, it is understood that a high dose rate is more effective than a low dose rate for removing pollutants, mainly $SO_2$ and $NO_x$, from effluent gases by irradiation with an ionizing radiation. It is also understood from said results and figure that a dose rate of at least $10^5$ rad/sec and a total dose of at least about 1 Mrad is required for carrying out the process effectively and efficiently.

The most important radiation source which can be advantageously employed in the practice of the present invention is an electron beam accelerator. The reason why said electron beam accelerator is the most important source is as follows.

As is known, when radioactive isotopes are employed as a radiation source, the "adsorbed dose rate" obtained is at most 1 Mrad/hr, namely 300 rad/sec or so, with the present technical level. It is difficult to obtain a higher adsorbed dose rate because of problems including generation of heat as a result of "self-absorption" that is, the absorption of radiation by the radioactive isotope itself and its melting caused thereby. Accordingly, it is almost impossible to treat a large amount of industrial effluent gases with isotopic irradiation to give a total dose of, for example, 1 Mrad or higher mainly for desulfurization and denitration. If Co-60 is used as a radiation source, a large amount of Co-60 and hours of irradiation will be required to satisfactorily treat the effluent gases at a dose rate of 1 Mrad/hr. However, it is practically impossible to let industrial effluent gases, which are usually present in an extremely great volume, stay in a reactor for several hours for irradiation. Usually, in the practice of industrial processes, the maximum allowable time for the gases to stay in a reaction chamber is 20 seconds or so. And, if a total dose of 2 – 3 Mrad is required to attain the desired removal of pollutants from effluent gases, the least necessary dose rate is calculated to be $10^5$ rad/sec, on condition that the maximum stay time of gas is 20 seconds.

One of the radiation sources which can provide such a high dose rate and is available at present is an electron beam accelerator. Some high power accelerators can easily provide a dose rate as high as $10^7$ rad/sec or so and, by using them, treatment of effluent gases can be advantageously carried out in a short time and economically according to the present invention. Another advantage of using an electron beam accelerator is that such as accelerator is safer to operate, because radioactivity disappears when the switch is off. In addition, the energy level of emitting radiation can be easily varied when it is used. Therefore, it is possible to change a dose rate and a total dose quickly in response to variations in the amount of effluent gases to be treated, or the pollutants content thereof, thereby making it possible to carry out the process most economically. Yet another important advantage of using an electron beam accelerator is that relatively light shielding apparatus is satisfactory, because the mean range of an electron beam is short.

It will be understood from the above explanation that the process for treating industrial effluent gases with irradiation to remove pollutants is industrially feasible only by using an electron beam accelerator, from the view points of feasibility, safety, economy and the like.

It should be noted that it is well known in the field of radiation chemistry that the irradiation effect of an electron beam is quite different from that of $\gamma$-rays, $\alpha$-rays or the like. For example, in polymerization of ethylenically unsaturated monomers or in cross-linking polymerization for curing prepolymers of unsaturated polyester resins by irradiation, the effect of 1 Mrad $\gamma$-rays irradiation at a dose rate of about $10^4$ rad/hr is almost equal to that of 10 Mrad electron beam irradiation at a dose rate of about $10^5$ rad/sec. Thus, the finding of the present inventors that the effect of 1 Mrad or more electron beam irradiation at a dose rate of about $10^5$ rad/sec is remarkably superior to that of 1 Mrad or more $\gamma$-rays irradiation at a low dose rate such as $10^3$ rad/sec was unexpected.

In another aspect of the study, the present inventors' attention was directed to the relation between the pressure of effluent gases and the efficiency of removal of pollutants. Namely, they studied about the effect of increasing gas pressure during the process in which effluent gases are irradiated with a radiation, and they found that the efficiency of removal of $NO_x$ and $SO_2$ is remarkably increased by increasing the pressure of effluent gases during the stage in which the gases are exposed to a radiation.

It has been found, according to the present inventors' previous studies, that in case the total dose is the same, the lower the pollutants content, the better the efficiency of removal of the pollutants. Judging only from the above fact, it was expected that an increase in the gas pressure would decrease the efficiency in removal of pollutants, because the density of gas increases as a result of an increase of pressure and in a dense state, the gas stream is similar to a gas stream with a high pollutant content. Thus, their finding that an increase in the pressure of gases which are being exposed to a radiation brings about better results for effectively removing pollutants from effluent gases was unexpected. Namely, they unexpectedly found that if the pollutant content is the same, higher pressure is preferable to lower pressure in the treating of effluent gases with irradiation, for removal of pollutants. The following examples are to illustrate the characteristic "pressure effect" of the present invention.

EXAMPLE 10

10 Nm$^3$/hr of heavy oil combustion gas initially containing 1000 ppm of $SO_2$ and 300 ppm of $NO_x$ was delivered to a reaction chamber where the gas was irradiated with electron beams at a dose rate of 2.15 × 10$^5$ rad/sec for a total dose of 0.8 Mrad at 2 atms, followed by delivering the irradiated gas to an electrostatic precipitator to collect the conglomerated pollutants thereby. Analysis of a gas sample taken from the stream after coming out from the outlet showed that $SO_2$ content was 420 ppm and $NO_x$ content was 57 ppm, which showed that the desulfurization rate was 58% and the denitration ratio was 81%. That is, 58% of $SO_2$ and 81% of $NO_x$ respectively were removed from the gas.

EXAMPLE 11

Example 10 was repeated except that the heavy oil combustion gas containing 500 ppm of $SO_2$ and 145 ppm of $NO_x$ was treated for purification. After the purification treatment, the $SO_2$ and $NO_x$ content was 160 ppm and 20 ppm respectively. Thus, the desulfurization ratio was 68% and the denitration ratio was 86%.

EXAMPLE 12

Example 10 was repeated except that the heavy oil combustion gas treated contained 1520 ppm of $SO_2$ and 590 ppm of $NO_x$. After the treatment, the $SO_2$ and $NO_x$ content was 745 ppm and 148 ppm respectively. Thus, the desulfurization ratio was 51% and the denitration rate was 75%.

EXAMPLE 13 (reference example)

Example 10 was repeated except that irradiation was carried out at 1 atm (atmospheric pressure). The $SO_2$ content was reduced from 990 ppm to 560 ppm (desulfurization ratio was 43%).

EXAMPLE 14 (reference example)

Example 11 was repeated except that irradiation was carried out at 1 atm (atmospheric pressure). The $SO_2$ content was reduced from 490 ppm to 210 ppm (desulfurization rate 57%) and the $NO_x$ content was reduced from 150 ppm to 40 ppm (denitration ratio 73%).

EXAMPLE 15 (reference example)

Figure 2:
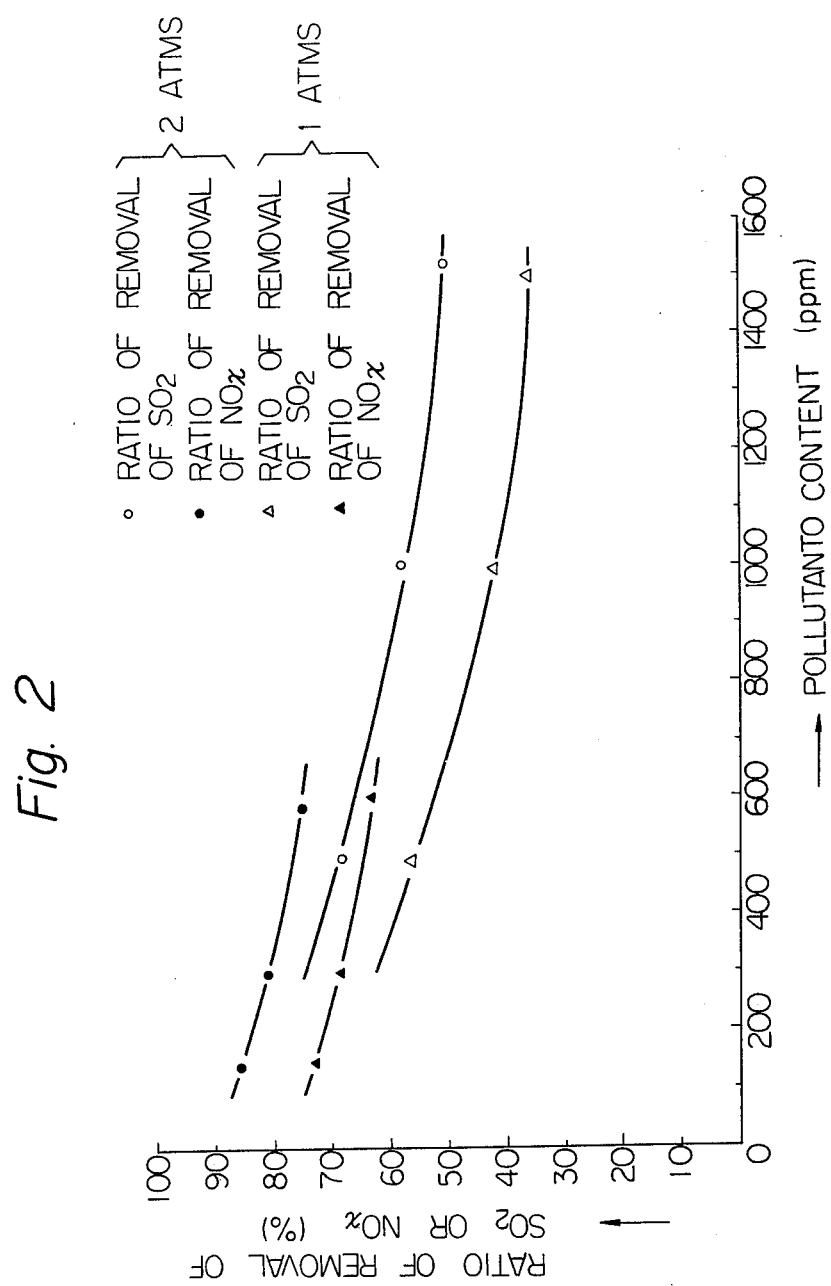
FIG. 2 shows the relationship between the amount of $SO_2$ or $NO_x$ removal and pollutants content at two different pressures.

Example 12 was repeated except that irradiation was carried out at 1 atm instead of 2 atms in Example 12. The $SO_2$ content was reduced from 1500 ppm to 960 ppm (desulfurization ratio 36%), and the $NO_x$ content was reduced from 600 ppm to 220 ppm (denitration rate 63%). The results of Examples 10 ~ 15 are shown in FIG. 2 altogether.

In yet another aspect of the study, the present inventors' attention was directed to finding out a process for removing, especially, nitrogen oxides more effectively. As already mentioned, nitrogen oxides are contained in effluent gases generated by combustion of heavy oil and the like fuels. In addition, a large amount of nitrogen oxides are produced when metals are dissolved in or surface treatment of metals is made by nitric acid, or when chemical synthesis is effected using nitric acid. The nitrogen oxides thus produced are considered to be one of the most important factors in air pollution, and therefore an effective process for removing nitrogen oxides is strongly desired at present. But, there has not been, up to now, a process for removing nitrogen oxides with satisfactory efficiency from the effluent gases by means of irradiation.

After many experiments on the subject, the present inventors found that by treating the effluent gases with irradiation and then washing the irradiated gases with water or an alkaline solution, nitrogen oxides can be removed from such effluent gases very effectively, the term "effluent gases" here including various combustion gases, gases generated by dissolving various metals in nitric acid, gases resulting from surface treatment of metals with nitric acid, gases resulting from various chemical synthesis using nitric acid and the like.

In the practice of this method, one important requirement is that at least 1% or so by volume of oxygen must be present in the effluent gases to be treated. Thus, when the gas to be treated contains almost no or less than 1% by volume of oxygen, the addition of oxygen, from an external source, to increase the oxygen content of the gas to 1% by volume or more is required.

The following examples are to illustrate characteristic "washing effect" of the invention.

EXAMPLE 16

Effluent gas containing 1000 ppm of nitrogen oxides was passed through a reaction chamber having capacity of 12.5 liters and kept at 25° C at a flow rate of 2 liters effluent gas per second. In the reaction chamber, the gas was irradiated with electron beams from Cockcroft-Walton type electron beam accelerator at a dose rate of 8 × 10$^5$ rad/sec for a total dose of 2 Mrad. After irradiation, the treated gas was bubbled, through a 1% aqueous solution of sodium hydrate for washing. After this washing treatment, a sample of the gas was subjected to analysis, which showed that the nitrogen oxides content had been reduced to 570 ppm.

EXAMPLE 17

Example 16 was repeated except that water was used instead of an aqueous solution of sodium hydrate in Example 16. The nitrogen oxides content was reduced to 850 ppm from the initial 1000 ppm.

EXAMPLE 18

Example 16 was repeated except that a 3% aqueous solution of sodium hydrate, instead of 1% aqueous solution thereof in Example 16, was used. The nitrogen oxides content was reduced to 620 ppm.

EXAMPLE 19

A portion of effluent gas containing 600 ppm of nitrogen oxide was put in a glass ampoule having the volume of 500 cc and it was sealed. Then, the gas was irradiated with γ-rays from Co-60 source at a dose rate of 5 × 10$^5$ rad/hr for 3 hours. Next, 500 cc portion of the irradiated gas was taken into a syringe which contains 20 cc of 1% aqueous solution of sodium hydrate. The gas thus taken was washed well by shaking the syringe. After that, the washed gas was analyzed for nitrogen oxides. The content of nitrogen oxide was 380 ppm.

EXAMPLE 20 (reference example)

The stream of effluent gas containing 2000 ppm of nitrogen oxides was passed through a reactor having volume of 12.5 liters and kept at 25° C at a rate of 1.5 liters per second. The gas was irradiated in the reactor with electron beams from a resonance-trans type electron beam accelerator at a dose rate of $5 \times 10^5$ rad/sec for a total dose of 2.0 Mrad. The irradiated gas was analyzed without being washed with water or an alkaline solution, and then the gas was analyzed for nitrogen oxides. The nitrogen oxides content was 2100 ppm.

In yet another aspect of the study, the present inventors concern was directed to an alternative method for removing nitrogen oxide by means of irradiation, in which irradiation was carried out in the presence of water and "washing after irradiation" was cancelled.

In particular, the alternative method comprises irradiating effluent gases containing nitrogen oxides with an ionizing radiation or ultraviolet light in the presence of water, thereby converting gaseous nitrogen oxides to products in mist or dust form and then, in the subsequent stage, collecting such reaction products by conventional collecting means such as electrostatic precipitators, cyclones, filters and the like.

This method is applicable to effluent gases containing at least nitrogen oxides, which have been already mentioned in some detail hereinbefore. In the practice of this method, the presence of a small amount of oxygen is required. The preferred range of the amount of oxygen required is from 1 to 10% by volume.

In the practice of this method, the effluent gas to be treated preferably contains moisture in an amount equivalent to or more than that of nitrogen oxides. Therefore, if the moisture content of the effluent gas is less than the amount equivalent to the amount of nitrogen oxides, the addition of moisture from external source before the gas is irradiated is preferable. If the moisture content is more than equivalent to the amount of nitrogen oxides, the gas may be irradiated as such, but even in such cases, additional water supply to the effluent gas at the reactor inlet or in the reactor by atomization will often improve the efficiency of the removal of pollutants.

The applicable irradiation dose rate depends on the $NO_x$ content of the effluent gas, the moisture content thereof and the like, but the dose rate in the range of from $10^5$ rad/sec to $10^7$ rad/sec is usually proper, although a dose rate out of this range can be employable for effective removal of $NO_x$.

The gas temperature during irradiation is preferably 100° C or more, although lower temperatures such as, for example, 20° C – 30° C may be allowed.

To keep the gas temperature in the collecting apparatus at a lower level than that in the irradiation state is desirable for effective collection of produced mist.

Useful collecting means for produced mist include electrostatic precipitators, cyclones, filters and the like.

The following examples will serve to illustrate the above mentioned method in more detail.

EXAMPLE 21

The stream of effluent gas containing 1000 ppm of nitrogen oxides was passed through the reactor having the content volume of 12.5 liters and kept at 100° C at a flow rate of 5 liters per second. 1 cc/sec of water was blown into the reactor after atomization and the gas in the reactor was irradiated with electron beams from a Cockcroft-Walton type electron beam accelerator at a dose rate of $8 \times 10^5$ rad/sec. After the irradiated gas had passed through the reactor, it was analyzed to determine the nitrogen oxides content, which was 650 ppm.

EXAMPLE 22

The stream of effluent gas containing 420 ppm of nitrogen oxides and 10,000 ppm of water was passed through the reactor having the content volume of 12.5 liters and kept at 100° C at a flow rate of 2 liters per second. The gas was irradiated with electron beams from a Cockcroft-Walton type electron beam accelerator at a dose rate of $8 \times 10^5$ rad/sec. The irradiated gas was delivered to the Cottrell dust collector and then the gas was analyzed to determine the nitrogen oxides content, which was 300 ppm.

EXAMPLE 23

Effluent gas containing 2500 ppm of nitrogen oxides was placed in a pressure resistant glass ampoule having the content volume of 200 cc together with 0.5 cc of water and the ampoule was sealed. The temperature in the ampoule was kept at 100° C and the gas therein was irradiated with $\gamma$-rays from a Co-60 source at a dose rate of $5 \times 10^5$ rad/hr for 3 hours. After irradiation, the temperature in the ampoule was lowered to 20° C immediately. Then, the produced mist was removed from the gas by passing it through a glass filter, and then the gas was analyzed to determine the nitrogen oxides content, which was 1800 ppm.

EXAMPLE 24 (reference example)

Example 21 was repeated except that no irradiation was effected. No reduction in the nitrogen oxides content was observed.

EXAMPLE 25 (reference example)

Nitrogen monoxide gas was mixed with dry air to produce a mixture containing 500 ppm of nitrogen monoxide. The mixed gas was treated according to the procedures as mentioned in Example 22. It was observed that no mist was produced after irradiation, and the analysis of the gas showed that the nitrogen oxide content had increased a little to 520 ppm.

In yet another aspect of the study, the present inventors' attention was directed to the improvement of a method for removing $NO_x$ and $SO_2$ from effluent gases by irradiation treatment. The inventors' principal attention was directed to the problem of cost decrease, because electron beam treatment of effluent gases is rather costly and therefore it is difficult to make it industrially feasible.

Now, it was found by the present inventors that the process can be carried out very economically by doing it in two steps.

Before a detailed explanation of this is given, it must be noted that there have been many effective and practical processes which can be carried out economically, as regards the methods for removing $SO_2$ from effluent gases. Such methods include, for example, a gas washing tower such as a Venturi scrubber and the like. On the contrary, of the methods for removing $NO_x$ from effluent gases, irradiation treatment is the most effective at the present technical level, and there are no alternative methods by which $NO_x$ can be almost completely removed from effluent gases. Therefore, if elimination of $NO_x$ can be effected rather rapidly as compared with elimination of $SO_2$, dividing the process into two steps will be advantageous from an economic viewpoint. With this in mind, the present inventors made many experiments and studied the results thereof.

Figure 3:
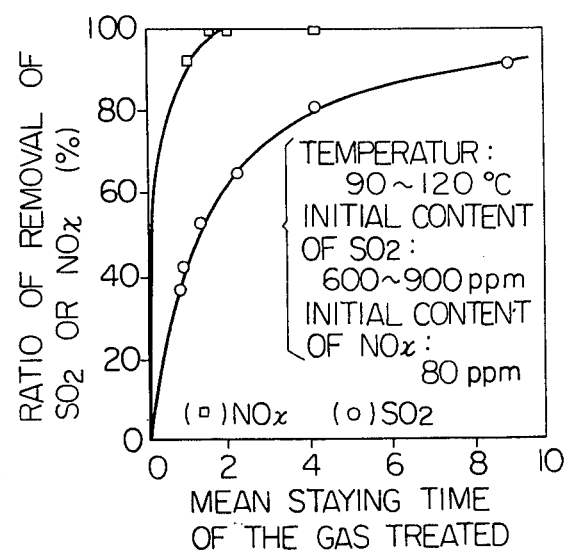
FIG. 3 shows the relationship between $SO_2$ or $NO_x$ removal and the mean staying time of the gas which is treated.

Referring now to the attached drawing, FIG. 3 shows the relation between the staying time of gas in the reaction chamber (that is, the irradiation time) and the desulfurization or denitration ratio. FIG. 3 clearly shows that there is a large difference between the time required for elimination of $NO_x$ and that for elimination of both $NO_x$ and $SO_2$. Thus, it is suggested that if electron beam irradiation is used for the elimination of $NO_x$ only, a small dose will be effective. According to FIG. 3, it is understood that $NO_x$ is eliminated within about 2 seconds, while even after 10 seconds irradiation, a significant amount of $SO_2$ remains in the effluent gas. This means that the complete removal of both $NO_x$ and $SO_2$ requires time at least 5 times longer than required for the removal of $NO_x$ only. Thus, it is understood that a major amount of an electron beam dose is consumed for converting gaseous $SO_2$ to mist, when electron beams are used for removing $NO_x$ and $SO_2$ completely from effluent gases. Considering that there have been many established methods of desulfurization which can be advantageously carried out on an industrial scale, electron beam irradiation is not always the best method for removing $SO_2$ from effluent gases, although it is the best method for the removal of $NO_x$. Hereupon, we got the idea that if effluent gases were treated in two steps, that is, first by irradiating the effluent gases with a minimum dose of electron beams to almost completely remove $NO_x$, and then effecting desulfurization of the irradiated gases by conventional methods of desulfurization such as, for example, using a gas-washing tower, it would be very effective and economical. Based on the above conception, the present inventors have made many studies.

According to these studies, it has been found that there is a relation as shown by the following equation between the amount of $NO_x$ removed by irradiation ($y$ ppm) and the total dose irradiated to the effluent gas ($x$ Mrad).

$$y = 160 \, x \quad (1)$$

Figure 4:
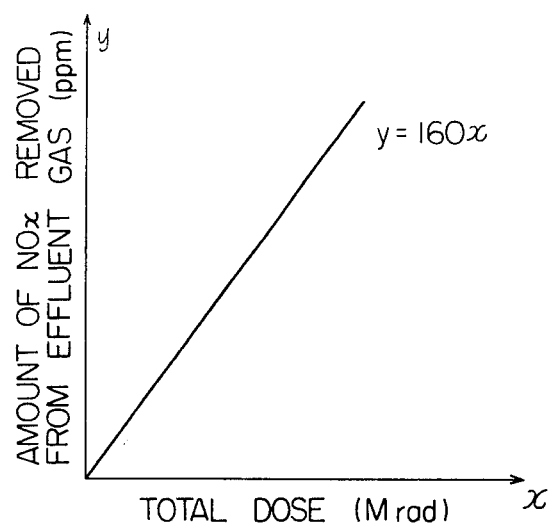
FIG. 4 shows the relationship between the amount of $NO_x$ removal and total dose rate.

It was confirmed by many experiments that the above equation applies almost exactly to the region of certain dose rate values. That is, when the dose rate is within a certain range, the amount of $NO_x$ removed from the effluent gas is independent from the dose rate and varies in proportion to the total dose given to the gas. The above equation (1) has been obtained by plotting the relations between the total dose (Mrad) and the amount of $NO_x$ removed from the effluent gas (ppm), as shown in FIG. 4.

According to the above equation, it is known that when the $NO_x$ content of the effluent gas is 70 ppm, the total dose of electron beam required to remove $NO_x$ almost completely is 0.44 Mrad. Similarly, when the $NO_x$ content is 300 ppm, the total dose required is calculated to be 1.88 Mrad, and for the $NO_x$ content 500 ppm, the total dose 3.1 Mrad is obtained.

Thus, in general, when the $NO_x$ content is $y$ ppm, the total dose ($x$ Mrad) required for removing $NO_x$ from the effluent gas substantially completely is given as $$x = (y/160) \, (Mrad) \quad (2)$$

Further details on the two-step method of the present invention are given as follows.

Figure 5:
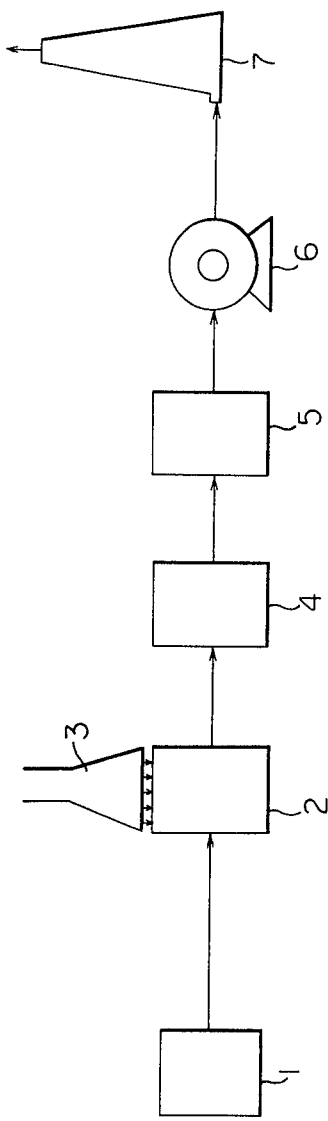
FIG. 5 shows a flow sheet of a preferred embodiment of the invention.

FIG. 5 shows a flow sheet of one preferred embodiment of the two-step treatment of effluent gases. In FIG. 5, the numerical symbol 1 represents the source of effluent gases, from which the gases move, passing through a conduit, to a reaction chamber 2. In the reaction chamber, the effluent gases are irradiated with electron beams from an electron beam generator 3 which is placed near said reaction chamber. By this irradiation, gaseous $NO_x$ present in the gases is converted to mist or solid particles together with part of $SO_2$ present in the gas. The irradiated gases with mist and solid particles thus produced are then delivered to a collector 4, where the mist and solid particles are removed from the gases. Then, the gases still containing a large amount of $SO_2$ but almost no $NO_x$ are delivered to a desulfurization apparatus 5, where the remaining $SO_2$ is substantially eliminated and the thus purified effluent gases are released into the atmosphere by a blower 6 through a stack 7.

It should be noted that in the above mentioned process the electron beam dose is limited to the minimum required for complete removal of $NO_x$, based on the value calculated from the above equation (2).

In carrying out this two-step method, the temperature within the collector is kept at less than the decomposition point of the reaction products of pollutants, usually within the temperature range of 150° ~ 200° C, or lower. This is required, because the corrosion of instruments by $NO_x$ resulting from the decomposition of the reaction products, or the remaining gaseous $NO_x$, must be avoided as much as possible. Mist and dust collectors which can be used in the practice of said method include conventional electrostatic precipitators, bag filters of special material and the like. As regards desulfurization apparatuses, washing towers and the like conventional apparatuses can be used conveniently in the practice of the above method.

As mentioned above, this two-step method has a significant meaning from an industrial viewpoint in that is provides a process for the complete removal of $NO_x$ and $SO_2$ which can be carried out very effectively, efficiently and economically.

Although the invention has been described in considerable detail with reference to certain preferred embodiments thereof, it will be understood that variations and modifications can be effected without departing from the spirit and scope of the invention as described hereinabove and as defined in the appended claims.

What we claim is:

1. A process for removing $NO_x$ and $SO_2$ from effluent gases, comprising
   increasing the pressure of the effluent gases containing $NO_x$ and $SO_2$ in a reaction chamber to a pressure in the range of from more than atmospheric pressure to about 2 atmospheres and at the same time irradiating the pressurized gases with an ionizing radiation from a radiation source which is placed near or in said reaction chamber, thereby converting gaseous pollutants, $NO_x$ and $SO_2$, to mist and solid particles, and then
   collecting the particles thus produced by a mist and dust collector.

2. The process of claim 1 in which the irradiation is carried out with electron beams from an accelerator placed near the reaction chamber at a dose rate of about $10^5$ rad/sec or higher to give a total dose of about 1 megarad or more.

3. The process of claim 2 wherein the pressure of the gases in the reaction chamber is increased to about 2 atmospheres.

4. A process for removing $NO_x$ from effluent gases, comprising delivering the effluent gases containing $NO_x$ to a reaction chamber inlet, moving said gases through the reaction chamber and at the same time irradiating the gases, including at least 1% by volume of oxygen, with an ionizing radiation from a radiation source placed near said reaction chamber, thereby converting gaseous $NO_x$ to mist and/or solid particles, delivering the irradiated gases with the particles thus produced to a washing tower, and there washing the gases with water and/or alkaline solution, and then releasing the washed gases into the atmosphere.

5. The process of claim 4 in which the irradiation is carried out with electron beams from an accelerator placed near the reaction chamber at a dose rate of about $10^5$ rad/sec or higher to give a total dose of about 1 megarad or more.

6. The process of claim 4, wherein the pressure of the gases in the reaction chamber is increased to about 2 atmospheres.

7. A process for removing $NO_x$ from effluent gases, comprising delivering the effluent gases containing $NO_x$ and at least an equivalent amount of moisture to a reaction chamber inlet, moving said gases through the reaction chamber and at the same time irradiating the gases with an ionizing radiation thereby converting gaseous pollutant, $NO_x$, to mist and/or solid particles, and then collecting the particles thus produced by a mist and dust collector.

8. The process of claim 7 in which the irradiation is carried out with electron beams from an accelerator placed near the reaction chamber at a dose rate of about $10^5$ rad/sec or higher to give a total dose of about 1 megarad or more.

9. The process of claim 7, wherein the pressure of the gases in the reaction chamber is increased to about 2 atmospheres.

10. A two-step process for removing $NO_x$ and $SO_2$ from effluent gases, comprising delivering said effluent gases containing $NO_x$ and $SO_2$ to a reaction chamber inlet, moving said effluent gases through said reaction chamber and irradiating them with an ionizing radiation from a radiation source which is placed near or in said reaction chamber thereby converting substantially all of the gaseous $NO_x$ to mist and/or fine solid particles.

delivering the thus irradiated gases containing mist and/or fine solid particles as well as the remaining gaseous $SO_2$ to a collecting apparatus and there separating said mist and/or fine solid particles from the gases, delivering the thus-treated gases containing substantial amounts of gaseous $SO_2$ to a means for desulfurization which does not depend on irradiation, and there removing the remaining $SO_2$, and releasing the thus purified gases into the atmosphere.

11. The process of claim 10 in which the irradiation is carried out with electron beams from an electron beam accelerator placed near the reaction chamber, and at a dose rate of about $10^5$ rad/sec or higher to give a total dose of about 1 megarad or more.

12. The process of claim 10, wherein the pressure of the gases in the reaction chamber is increased to about 2 atmospheres.

* * * * *

REEXAMINATION CERTIFICATE (257th)

United States Patent [19]

Machi et al.

[11] B1 4,004,995

[45] Certificate Issued Oct. 2, 1984

[54] PROCESS FOR REMOVING NITROGEN OXIDES AND SULFUR DIOXIDE FROM EFFLUENT GASES

[75] Inventors: Sueo Machi, Takasaki; Keita Kawamura, Yokohama; Shingi Aoki, Fujisawa; Waichiro Kawakami; Shoji Hashimoto, both of Takasaki, all of Japan

[73] Assignees: Ebara Manufacturing Co., Ltd.; Japan Atomic Energy Research Institute, both of Tokyo, Japan

Reexamination Request:
No. 90/000,308, Dec. 21, 1982

Reexamination Certificate for:
Patent No.: 4,004,995
Issued: Jan. 25, 1977
Appl. No.: 446,788
Filed: Feb. 28, 1974

[30] Foreign Application Priority Data

| Mar. 3, 1973 | [JP] | Japan | 48-25290 |
| Mar. 3, 1973 | [JP] | Japan | 48-25292 |
| Aug. 15, 1973 | [JP] | Japan | 48-91549 |
| Aug. 15, 1973 | [JP] | Japan | 48-91550 |
| Sep. 22, 1973 | [JP] | Japan | 48-107123 |

[51] Int. Cl.$^3$ .................. B01J 19/08; B01J 19/12
[52] U.S. Cl. ............. 204/157.1 H; 204/157.1 R; 423/235; 423/242 R
[58] Field of Search ............. 204/157.1 R, 157.1 H, 204/177; 423/235, 235 D, 390, 385, 393; 422/186

[56] References Cited

U.S. PATENT DOCUMENTS

| 871,640 | 11/1907 | Schonherr et al. | 423/385 |
| 2,064,260 | 12/1936 | Herrman | 204/157.1 H |
| 3,120,479 | 2/1964 | Dols | 204/157.1 R |
| 3,869,362 | 3/1975 | Machi et al. | 204/157.1 H |
| 3,890,103 | 6/1975 | Koniszi | 422/186 |
| 3,997,415 | 12/1976 | Machi et al. | 423/235 |

FOREIGN PATENT DOCUMENTS

| 48-17471 | 3/1973 | Japan | 204/157.1 H |
| 51-8636 | 3/1976 | Japan | 204/157.1 H |

OTHER PUBLICATIONS

Kawamura et al., Journal of Japan Atomic Energy Society, vol. 14, No. 11, (1972), pp. 597–599.

*Primary Examiner*—Gary P. Straub

[57] ABSTRACT

Removal of gaseous pollutants such as nitrogen oxides and sulfur dioxide from effluent gases can be carried out advantageously from an industrial viewpoint by effecting irradiation of said gases under specifically selected conditions. High dose rate electron beam irradiation at a dose rate in the region of $10^5$ rad/sec or higher is, unexpectedly, remarkably effective and efficient for said purpose. Irradiation under increased pressure is also preferable. Wash of gases after irradiation or effecting irradiation in the presence of water vapor is effective especially for the removal of nitrogen oxides. Further, by carrying out the process in two-steps in which nitrogen oxides are removed from such gases almost completely by irradiation with the minimum dose of electron beams before sulfur dioxide is removed from the thus treated gases by conventional desulfurization means, the process can be carried out very economically. Thus, it has become industrially feasible to treat the effluent gases with irradiation, for the removal of nitrogen oxides and sulfur dioxide before releasing them into the atmosphere.

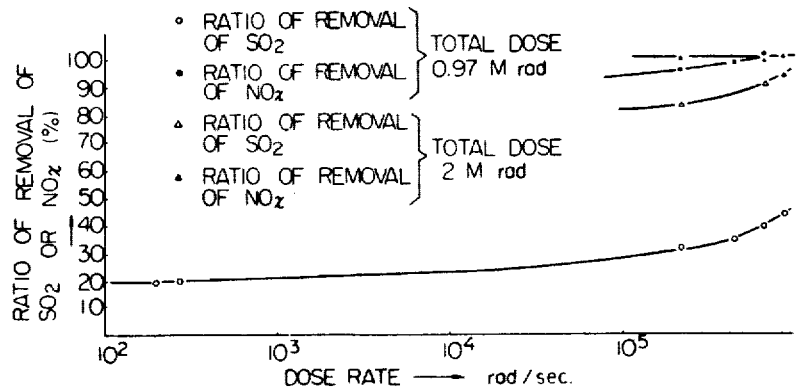

REEXAMINATION CERTIFICATE ISSUED UNDER 35 U.S.C. 307.

THE PATENT IS HEREBY AMENDED AS INDICATED BELOW.

AS A RESULT OF REEXAMINATION, IT HAS BEEN DETERMINED THAT:

The patentability of claim 3, 6, 9, 11 and 12 is confirmed.

Claims 1, 2, 4, 5, 7, 8 and 10 are cancelled.

* * * * *